(12) United States Patent
Zink

(10) Patent No.: US 7,577,921 B2
(45) Date of Patent: Aug. 18, 2009

(54) METHOD AND SYSTEM FOR PERFORMING SEARCH USING ACRONYM

(75) Inventor: David Zink, Menlo Park, CA (US)

(73) Assignee: VUDU, Inc., Santa Clara, CA (US)

( * ) Notice: Subject to any disclaimer, the term of this patent is extended or adjusted under 35 U.S.C. 154(b) by 249 days.

(21) Appl. No.: 11/458,385

(22) Filed: Jul. 18, 2006

(65) Prior Publication Data

US 2009/0024603 A1 Jan. 22, 2009

(51) Int. Cl.
G06F 3/048 (2006.01)
G06F 17/00 (2006.01)
G06F 7/00 (2006.01)

(52) U.S. Cl. .................. 715/822; 715/968; 715/859; 715/713; 715/716; 715/719; 715/720; 715/721; 715/738; 715/739; 715/805; 715/853; 715/825; 715/210; 707/3

(58) Field of Classification Search ................. 715/713, 715/716, 719–721, 738–739, 773, 805, 853, 715/825; 707/3
See application file for complete search history.

(56) References Cited

U.S. PATENT DOCUMENTS

| | | | |
|---|---|---|---|
| 5,530,754 A | 6/1996 | Garfinkle | |
| 5,798,785 A | 8/1998 | Hendricks et al. | |
| 5,812,123 A | 9/1998 | Rowe et al. | |
| 5,831,662 A | 11/1998 | Payton | |
| 5,838,314 A | 11/1998 | Neel et al. | |
| 5,886,730 A | 3/1999 | Tsosie | |
| 6,005,565 A | 12/1999 | Legall et al. | |
| 6,177,931 B1 | 1/2001 | Alexander et al. | |
| 6,247,043 B1* | 6/2001 | Bates et al. | 709/200 |
| 6,285,987 B1 | 9/2001 | Roth et al. | |
| 6,515,680 B1 | 2/2003 | Hendricks et al. | |
| 6,564,213 B1* | 5/2003 | Ortega et al. | 707/5 |
| 6,622,148 B1* | 9/2003 | Noble et al. | 707/104.1 |
| 7,010,616 B2* | 3/2006 | Carlson et al. | 709/246 |
| 7,024,679 B1 | 4/2006 | Sie et al. | |
| 7,281,261 B2 | 10/2007 | Jeff et al. | |
| 7,293,275 B1 | 11/2007 | Krieger et al. | |
| 7,392,326 B2* | 6/2008 | Vale | 709/245 |
| 2003/0046276 A1* | 3/2003 | Gutierrez et al. | 707/3 |
| 2003/0046698 A1 | 3/2003 | Kamen et al. | |
| 2003/0115597 A1 | 6/2003 | Yassin et al. | |
| 2004/0117831 A1 | 6/2004 | Ellis et al. | |
| 2004/0130975 A1* | 7/2004 | Kii et al. | 369/30.09 |

(Continued)

OTHER PUBLICATIONS

Google-2005-ScreenShot (Google Inc., Copyright 2005; http://web.archive.org/web/20060101175628/www.google.com/, 3 pages).*

(Continued)

*Primary Examiner*—Sy D Luu
*Assistant Examiner*—Linh K Pham
(74) *Attorney, Agent, or Firm*—Shemwell Mahamedi LLP

(57) ABSTRACT

Techniques for facilitating efficient local search using acronym are disclosed. According to one aspect of the techniques, a graphic user interface is provided to accept inputs from a user; letters successively entered as the inputs from the user are received; and titles are then progressively reduced and displayed in accordance with the letters, wherein the titles have words each beginning with one of the letters.

20 Claims, 9 Drawing Sheets

U.S. PATENT DOCUMENTS

| | | | |
|---|---|---|---|
| 2005/0005241 A1 | 1/2005 | Hunleth et al. | |
| 2005/0076363 A1* | 4/2005 | Dukes et al. | 725/46 |
| 2005/0283468 A1* | 12/2005 | Kamvar et al. | 707/3 |
| 2005/0289593 A1 | 12/2005 | Spilo | |
| 2006/0026635 A1* | 2/2006 | Potrebic et al. | 725/37 |
| 2006/0026639 A1 | 2/2006 | Potrebic et al. | |
| 2006/0037037 A1* | 2/2006 | Miranz | 725/2 |
| 2006/0146436 A1* | 7/2006 | Goodwin et al. | 360/69 |
| 2006/0206454 A1* | 9/2006 | Forstall et al. | 707/3 |
| 2006/0218088 A1* | 9/2006 | Flora et al. | 705/39 |
| 2006/0248078 A1* | 11/2006 | Gross et al. | 707/5 |
| 2008/0126996 A1* | 5/2008 | Morris et al. | 715/854 |

OTHER PUBLICATIONS

Movie Manua; Bitz & Pixelz BV; copyright © 2000-2008 http://downloads.collectorz.com/manuals/movie_manual_en.pdf.*

Non-Final Office Action dated Oct. 7, 2008 in U.S. Appl. No. 11/383,751, 8 pgs.

Non-Final Office Action dated Jul. 9, 2008 in U.S. Appl. No. 11/226,625, 19 pgs.

Non-Final Office Action dated Jun. 26, 2008 in U.S. Appl. No. 11/203,021, 15 pgs.

Rush_Hour_2_Movie_Poster.pdf, www.imdb.com Key Word: "Rush Hour 2".

* cited by examiner

METHOD AND SYSTEM FOR PERFORMING SEARCH USING ACRONYM

TECHNICAL FIELD

The present invention relates generally to the area of searching on a computing device in a client-server environment, and in particular, to a method and system for facilitating a client-side search of a library of video titles using structured data.

BACKGROUND

There are a variety of ways to implement searching methods and mechanisms in a client-server environment. For example, in a conventional client-server environment 10, such as that illustrated in FIG. 1, a user utilizes a user interface to enter a search term at a client device 12. The search term is then communicated over a network 14 to the server 16, where the search is executed. For example, the server 16 may execute a search, based on the search term entered by the user, for data stored on the data storage device 18. Consequently, the server 16 does the bulk of the processing at the time the search is requested. Moreover, latency is introduced into the system as the client 12 is forced to wait for the server 16 to process the search, and return results to the client 12 via the network 14 that may introduce significant delays.

In some client-server environments, it is essential that the latency be reduced to a minimum. For example, in the context of an electronic programming guide (EPG), it is essential that the client-side user interface respond rapidly to input by the user. For example, if a user enters the name, or title, of a particular show or movie during a search, the server needs to respond to the client rapidly with results that satisfy the search. Similarly, if a user is scrolling through a listing of currently showing titles, the user interface must be responsive quickly, or the user may become frustrated with perceived delays. Because there may be a significant number of client devices 12 accessing the server 16, the server must be capable of processing multiple requests rapidly.

To further complicate matters, the client device may have limited processing power. For example, system developers are often required to make tradeoffs between cost and performance when developing client devices. Accordingly, to reduce the cost of the client device, system developers often use cost effective components which limit processing power and storage capacity. In the context of such restraints, there exists a need for highly efficient searches with limited user-perceived latency on the client side.

SUMMARY OF THE DESCRIPTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Broadly speaking, the present invention is related to techniques for graphic user interfaces. According to one aspect of the present invention, method and system for facilitating a client-side search of one or more items are disclosed. According to one embodiment of the invention, a server analyzes a collection of data on a storage device, and organizes the data to generate a structured data image. Once generated, the structured data image is communicated to one or more clients via a network. The client facilitates user searches of the data within the structured data image. Moreover, the structured data image is organized such that client-side searches are efficient. Other objects, advantages and features of the present invention will become apparent upon examining the following detailed description of an embodiment thereof, taken in conjunction with the attached drawings.

BRIEF DESCRIPTION OF THE DRAWINGS

The invention will be readily understood by reviewing the following detailed description in conjunction with the accompanying drawings, in which like references indicate similar elements and in which.

DETAILED DESCRIPTION

Techniques for facilitating an efficient client-side search are disclosed. In the following description, for purposes of explanation, numerous specific details are set forth in order to provide a thorough understanding of the present invention. It will be evident to one skilled in the art, however, that the present invention may be practiced without these specific details. The description and representation herein are the means used by those experienced or skilled in the art to effectively convey the substance of their work to others skilled in the art. In some instances, to avoid unnecessarily obscuring aspects of the present invention, well-known operations and components have not been described in detail.

Reference herein to "one embodiment" or "an embodiment" means that a particular feature, structure, operation, or other characteristic described in connection with the embodiment may be included in at least one implementation of the invention. However, the appearance of the phrase "in one embodiment" or the phrase "in an embodiment" in various places in the specification does not necessarily refer to the same embodiment.

Figure 1:
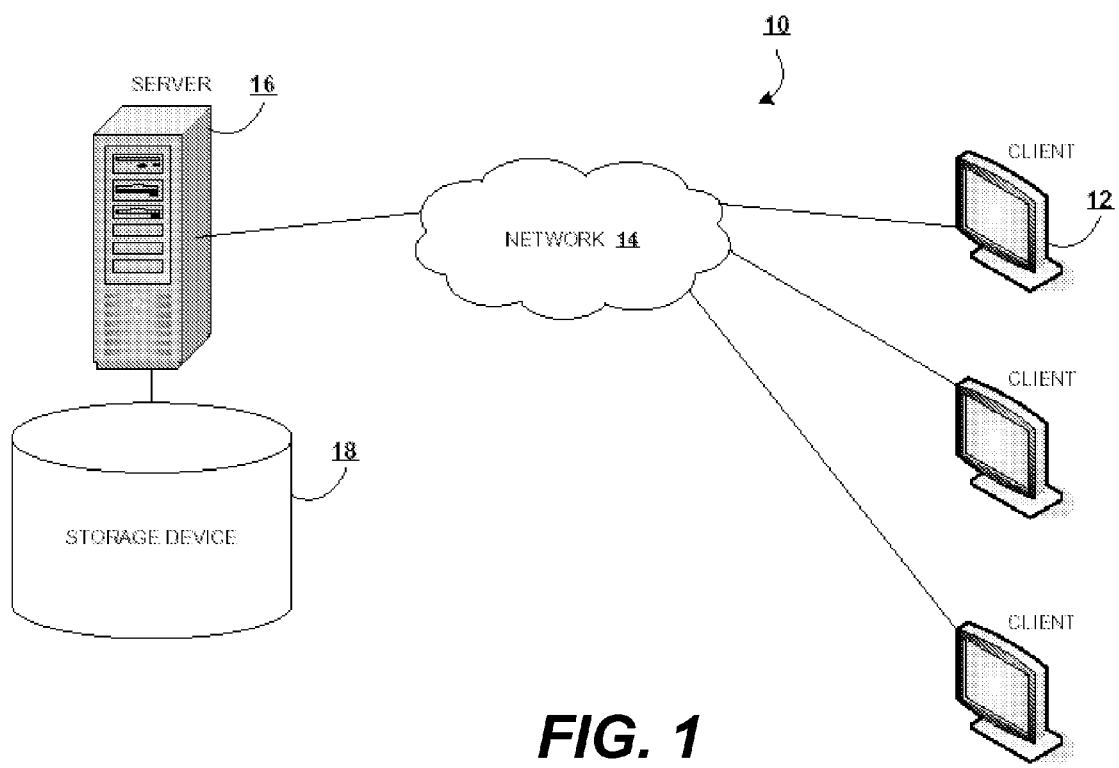
FIG. 1 illustrates a conventional client-server environment in which a client performs a search of data stored on a server's data storage device.
Figure 2:
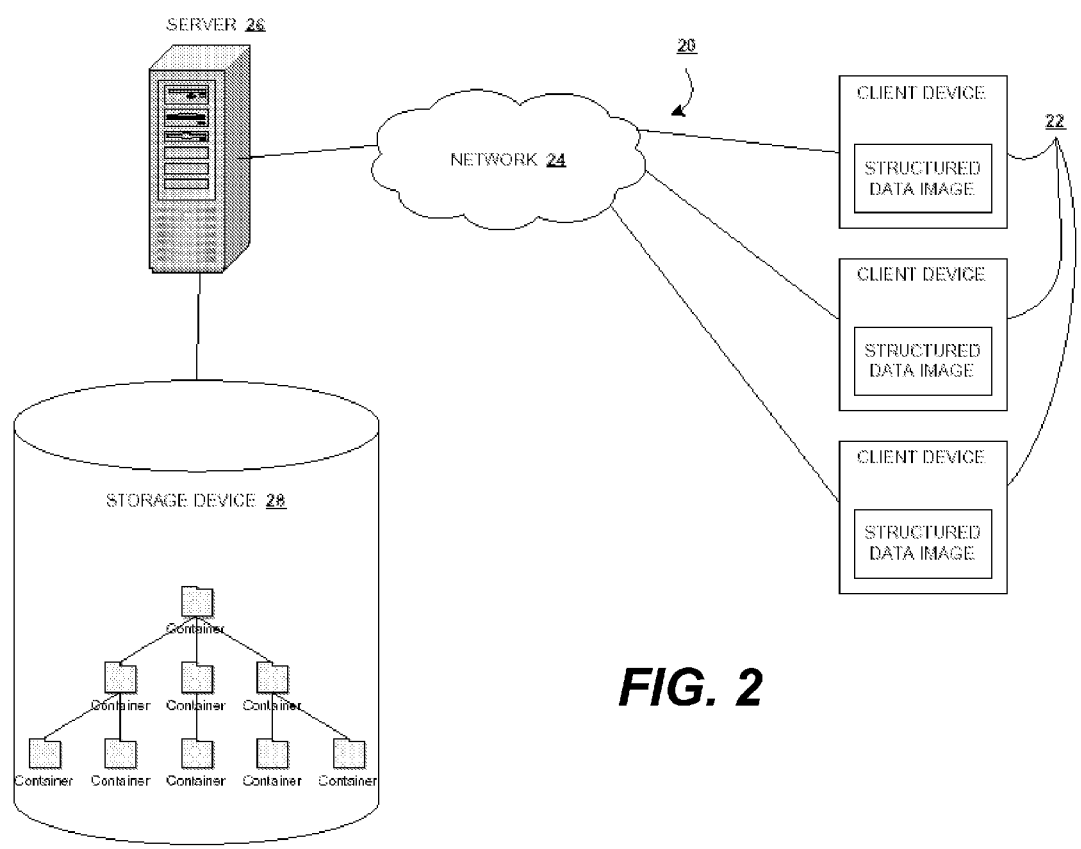
FIG. 2 illustrates a client-server environment in which a client performs a client-side search, according to an embodiment of the invention.

FIG. 2 illustrates a client-server environment 20 in which a client 22 performs a client-side search, according to an embodiment of the invention. As illustrated in FIG. 2, several client devices 22 are coupled by means of a network 24 to a server 26. Attached to the server 26, there is a storage device 28 that contains data associated with digital content (e.g., video/audio, such as movies, etc.) that is available by means of a digital content server. In one embodiment of the invention, the server 26 will double as a digital content server. In another embodiment of the invention, a separate digital content server may be implemented. In still another embodiment, the server 26 is configured to manage all clients in service that are collectively and locally cache all contents for a library being offered to the subscribers.

In any case, the data associated with the digital content is stored, in one embodiment of the invention, in a hierarchical tree-like directory. For example the directory tree may be organized such that each node represents an individual movie title, and each node may be extended to other nodes or branches. Each of the branches includes data about that particular movie title. The data may include textual information about the movie, actor/actress, director as well as graphical images, and/or video/audio clips associated with the movie.

In one embodiment of the invention, the server 26 is configured to collect data about a movie, selectively read the data, organize the data, and write the data to form a structured binary database, also referred to as a structured data image. In the context of the invention, a structured data image is simply data that is organized according to a predefined format. For example, as described in greater detail below, in one embodiment of the invention, the structured data image has a header portion defining aspects of the structured data image, a plurality of data segments representing short-records for each movie title, and a plurality of data segments representing detailed records for each movie. Each "record" may include textual data, as well as inline graphics images and/or audio and video data clips. According to one embodiment of the present invention, at least some of the structured data image is located in RAM of a client device. When a search is requested, the latency from getting the search results is minimized, and at the same time, each record for a movie having a title that matches the search term can be read consecutively, and presented to the user without noticeable delay.

According to one embodiment, the data is first collected on a server where it is analyzed and transformed into a binary data image which is then distributed to the inexpensive devices. The binary data image can only be retrieved in an integral number of "sectors" aligned on "sector" boundaries; therefore a data store (e.g., a memory or storage) is organized as a sequence of (tunable-sized) "blocks" (e.g., 4 KB) numbered from 0 to N. Any range of contiguous blocks can be represented as an index. In one embodiment, m-bit (e.g., m is between 16 and 32) is used to represent a block or a number of contiguous blocks, which leaves (32-N) bits available to encode another value such as the number of blocks. In operation, the (32-N) bits are to encode a number between 1 and (2**(32-N)) inclusive. In this manner, the location of fairly large objects can be encoded in 32 bits so long as they are aligned on block boundaries.

In one embodiment, for each primary record (Movie) three records are created; an extremely detailed record used for detailed views; a simple record containing sufficient information (including an entire placard image) to display the (Movie) in one of the lists, and a miniature record so small (20 bytes) that 10,000 of them can be stored persistently in memory without exceeding required limitations. The miniature record includes a 32-bit encoded data location for the simple record, and the simple record contains the location of the extremely detailed record; additionally the simple record is the initial subset of the extremely detailed record. The miniature records contain enough information to allow filtering and sorting; most yes-no memberships (genres, etc.) are represented as bits in a bitfield, release dates are represented as 16-bit numbered dates (the number of days after a fixed day in the past), and "popularity" (user rating) is represented as a one-bye integer.

In one embodiment, alphabetization is used. Alphabetization generally requires full names, which can be fairly long and would require an additional at least 250 KB of memory (e.g., RAM). Instead the records are alphabetized at analyzing time, each record is assigned an alphabetization number so that sorting by the alphabetization number produces the same results as alphabetizing by the full name. Additionally, these numbers are distributed evenly across the range of numbers represented by the given data type (such as 0 to 65535 for a 16-bit number); this allows additional records to be added alphabetized between existing records without needing to renumber all records.

An example is provided: Block 0 of the store is used to store summary information about the entire store as well as the locations of various subparts. The first subpart is the array of miniature records for all movies. Additional subparts are used to store other information used to satisfy queries. For instance, a genre-based search menu requires a number of images used to represent either selected or unselected genres; these are stored in a sub-part, and the first portion of that subpart is an index to the appropriate images. Much of the remainder of the store is taken up by detailed primary records which are referred to by the miniature records. There are subparts which store the heads of the trees used for locating movies by key word or by other strings.

Accordingly, each client device will receive a copy of the structured data image, which each client will use when searching data. Consequently, one advantage of the invention is that it removes latency from the system caused by communicating searches to the server. Instead, searching is performed locally at the client. Moreover, the individual records are organized to be efficiently read and displayed, based on user searches.

Figure 3A:
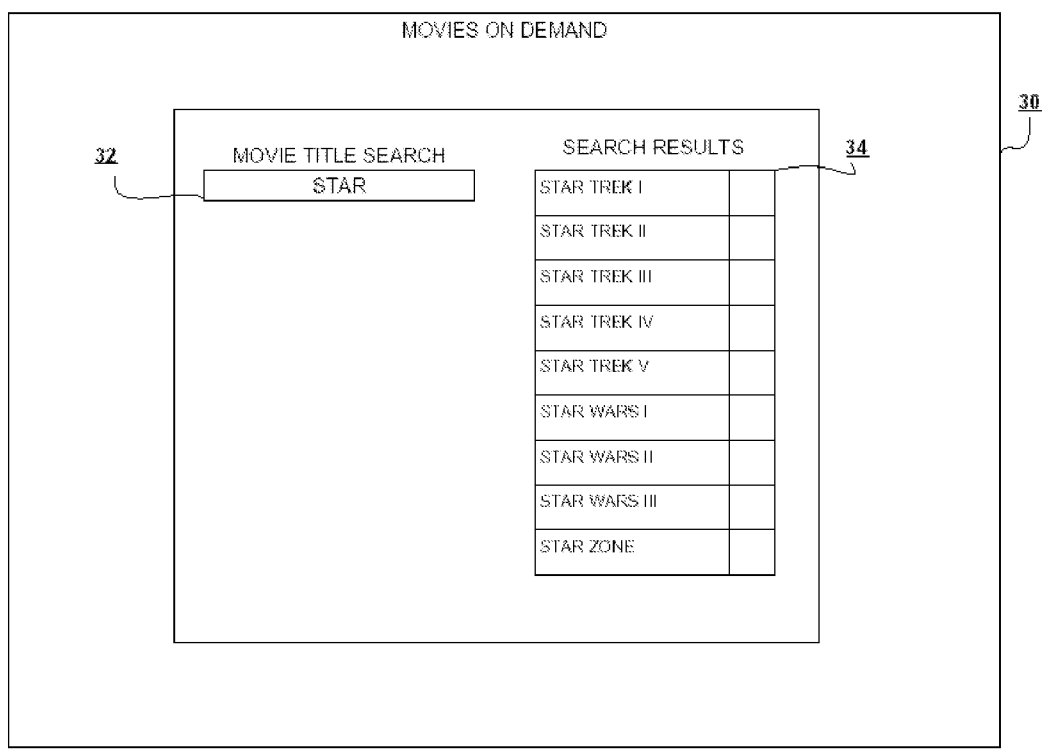
FIG. 3 illustrates a client user interface, according to one embodiment of the invention.

FIG. 3A illustrates a client user interface, according to one embodiment of the invention. For example, as illustrated in FIG. 3A, the client user interface 30 is a graphical user interface. Accordingly, a search bar 32 may be provided for allowing a user to input a search term. In one embodiment of the invention, as the user enters text into the search bar, the search results are automatically displayed, and updated. For example, if the user enters the letter "S" in the search bar, all titles beginning with the letter "S" are displayed. As the user adds the letter "T" in the search bar to form "ST", all of the titles beginning with the letters "ST" will be displayed, and so on. Accordingly, as illustrated in FIG. 3A, when the user enters the word "STAR" in the search bar 32, all movies with a title that match are displayed in the results area 34.

In one embodiment of the invention, a user can search for titles by entering the acronym corresponding to the movie title. For example, by entering only the first letter of each word in a multi-word title, a user can search for a particular movie title. For example, by entering the letters "LOTR", a user may find movies from the "Lord of the Rings" series of movies. This is particularly useful with a client device is equipped with limited input means, for example, such as virtual keyboards displayed on a monitor that can be navigated with a pointing device. It should be noted that the search based on acronym may also be used in languages other than alphabet-based languages.

In operation, some entries from a user, regardless whether they form an acronym or actual words from move titles, may lead to a number of titles that may not fit in one display so that the user may have to perform an action to see additional titles. For example, there are 5000 titles in a movie library, entry of "ST" may still lead to 100 selected titles of which only 20 titles may be visible at one time. The user would have to go through the selected titles to find the desired one. The subset of the selected titles that are initially visible may be chosen so as to make the search process more efficient. In one embodiment this is accomplished by ordering the selected titles so that the desired initially visible subset are grouped together, then adjusting the view of the selected titles so that they are visible.

In one embodiment, the ordering of the selected titles is made to ensure that the initially visible movie titles are those that are most likely to be the ones the user desires to select. The ordering criteria may take into account the static features of the movies such as its title and cast list. Movies where the first word of the title begins with ST such as "Star Wars" are more likely matches than movies where the fourth word begins ST such as "Return of the Stallion". The ordering criteria may take into account the dynamic features of the movies such as the current popularity of each of the movies, respective genre, director/actors versus the user's viewing habit or ordering history, for instance, should the user enter "ST" the selected movie titles might begin with "Star Wars" and "A Star is Born (1976)" ahead of titles such as "Stick it". The ordering criteria may take into account user-specific information, for example, should a Barbara Streisand fan enter "ST", the selected movie titles might begin with "A Star is Born (1976)". In addition, the ordering criteria may take into account purely practical information, for instance, there is no further character the user can type to bring up a movie literally named "ST" into the visible area, whereas adding an "I" to make "STI" would cause "ST", "Star Wars", "A Star is Born (1976)" and so on to disappear while bringing "Stick It" and so on into the visible area.

When a user enters a sequence of characters that match both a word prefix and an acronym the acronym matches are sorted after the word-prefix matches. As an example, it is assumed that the user types a first entry "R" which matches the following movie titles presented in the specified order:
Return of the King
Rotten Tomatoes
The Return of Zorro
Radio Free Albemuth
Rot in Zanzibar
Rotten at the Core
Dirty Rotten Scoundrels
Something's Rotten
Dry Rot
Joe's Rotten World
Alex and Ro
Star Wars III: Return of the Jedi where all movies with R at the beginning of the first word are ordered by popularity, which is followed by the matched 2nd word and so on. In any case, a movie title would never appear twice, even if words and acronym of the title are both matched.

A second letter "O" is then added forming the entry "RO", which results in a narrowed list of movie titles presented in the specified order:
Alex and Ro
Rotten Tomatoes
Rot in Zanzibar
Rotten at the Core
Dirty Rotten Scoundrels
Something's Rotten
Dry Rot
Joe's Rotten World
Return of the King
The Return of Zorro where all movies with RO at the beginning of the first word or subsequent words in a title are ordered by popularity, then followed by the titles matched by acronym, which go last. In any case, an exact match will go first. In the above example, the title "Star Wars III: Return of the Jedi" does not match the entries because the acronym matching is designed to start at the beginning of consecutive words. In one embodiment, the acronym matching is conducted after colons thus "Return of the Jedi" would still match.

A third letter "T" is then added forming the entry "ROT", which results in an even narrower list of movie titles presented in the specified order:
Rot in Zanzibar
Dry Rot
Rotten Tomatoes
Rotten at the Core
Dirty Rotten Scoundrels
Something's Rotten
Joe's Rotten World
Return of the King where, similarly, all movies with ROT at the beginning of the first word or subsequent words in a title are ordered by popularity, then followed by the titles matched by acronym, which go last. An exact match will always go first.

A fourth letter "K" is then added forming the entry "ROTK", which results in a list of movie titles with only a single movie:
Return of the King In general, when the user enters an acronym (such as "ROTK"), the letters do not match any prefix and therefore the acronym matches appear on the first page.

According to another embodiment, when ordering matches so that the best matches are initially visible, an article such as "A", "AN" or "THE" in the title is considered "optional" in the sense that "A STAR IS BORN" and "STAR WARS" are both considered to begin with the word "STAR" for ordering purposes and are equally likely matches for "STAR". Likewise, "ROTK" is considered to match "The Return of the King" exactly. However, if the user enters "A STAR" only "A STAR IS BORN" will be considered a match.

Figure 3B:
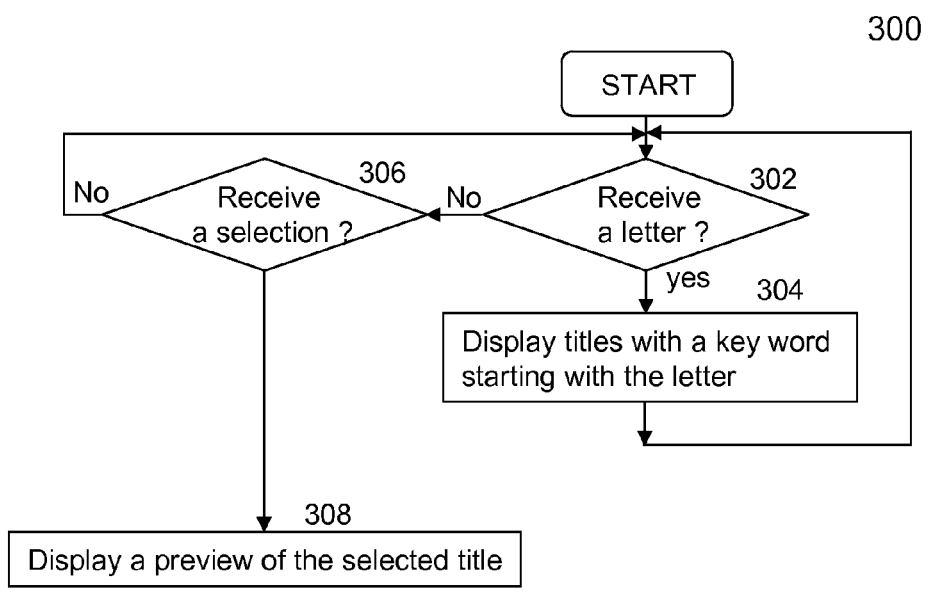

FIG. 3B shows a flowchart or process 300 of searching a title using the word prefix and acronym matching. The process 300 may be implemented in software, hardware or in a combination of both but executed locally in a client device. When a user decides to look for a movie, a graphic user interface may be displayed. The graphic user interface includes an entry window that receives inputs from the user. The inputs may be entered via a remote control, an on-screen displayed keypad, or a voice-activated device. In any case, at 302, the process 300 determines whether the user has entered a letter. It is assumed that the user enters a letter that may represent a word in a title. The process 300 goes to 304 where all titles in a library being offered that include a word beginning with the letter are displayed. Depending on implementation, an article, such as "a" or "the" may or may not be counted. In other words, if the user enters "a", a title with an article "An" may not be listed.

In general, there are a number of titles with words that may begin with the entered letter. So the user may want to narrow down the search by entering another letter, so the process 300 goes back to 302. As the user enters more letters, the number of titles being displayed at 304 may be progressively reduced. At a certain point, the user may not enter a letter, thus the process 300 goes to 306 to determine whether the user has selected a title from the displayed titles. If the user did not select a title from the displayed titles, the process 300 goes to 302 to allow the user to enter another letter. On the other end, according to one embodiment, the displayed titles that have words each start with the entered letters are scrollable, for example, allowing a highlight bar to move from one title to another. Once a title is selected, the process 300 then goes to 308 where another graphic user interface is displayed. The graphic user interface may allow the user to order the selected movie or watch a preview of the movie.

Figure 4:
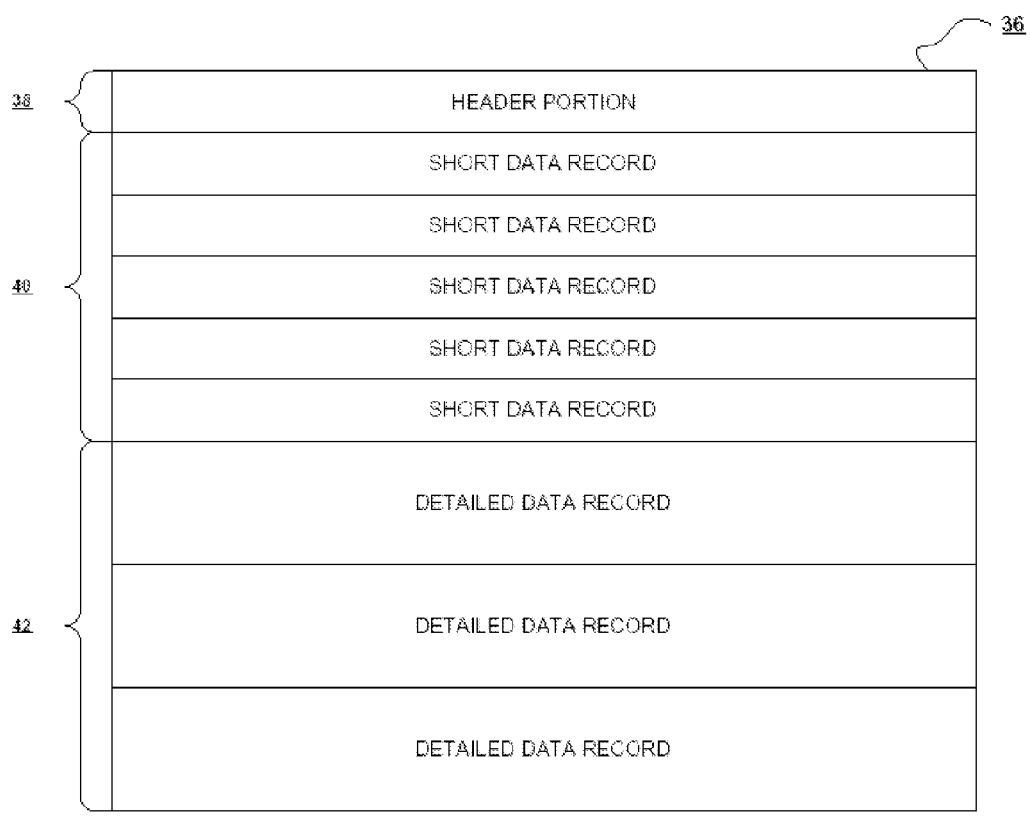
FIG. 4 illustrates a client-side structured data image containing data from a server, according to one embodiment of the invention.

FIG. 4 illustrates a client-side structured data image containing data from a server, according to one embodiment of the invention. As illustrated in FIG. 4, the structured data image 36 includes a header portion 38, a plurality of data segments representing short-records 40 for each movie title, and a plurality of data segments representing detailed records for each movie title. The short data records may include textual information related to the movie title as well as a small graphic image. Accordingly, data from the short-record may be displayed in a listing of search results, when the particular movie corresponding to the short record matches a search term entered by the user. Similarly, data from the detailed record may be displayed to the user when the user selects a particular movie from a list of movies that match the search term.

Figure 5:
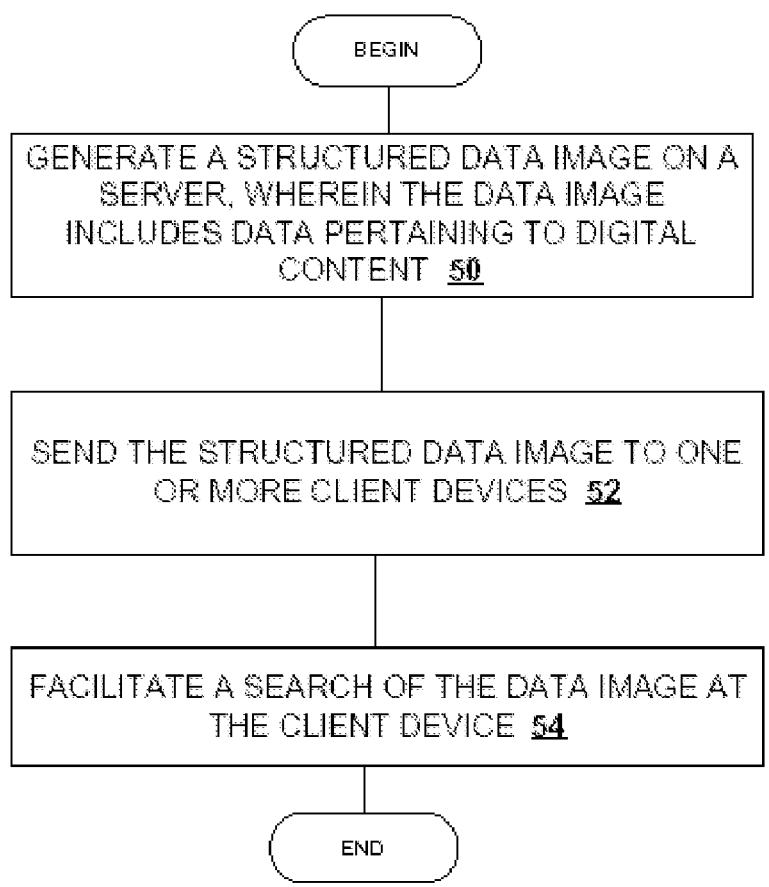
FIG. 5 illustrates a method, according to an embodiment of the invention, for facilitating a client-side search.

FIG. 5 illustrates a method, according to an embodiment of the invention, for facilitating a client-side search. At operation 50, a server generates a structured data image by analyzing data associated with digital content that is stored on storage device. Next, at operation 52, the server communicates or sends the structured data image to one or more client devices. Finally, at operation 54, a client device facilitates a search of data included with the structured data image. Based on the search, portions of the data from the structured data image are displayed to the user.

Figure 6:
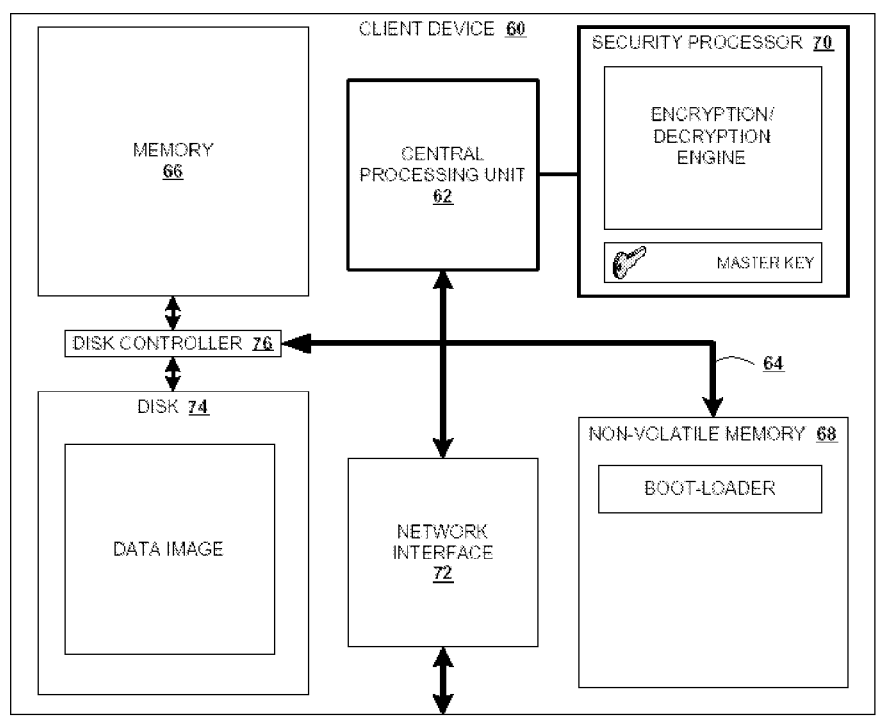
FIG. 6 illustrates a client according to an embodiment of the invention.

FIG. 6 illustrates a function diagram of a client device according to an embodiment of the invention. As illustrated in FIG. 6, the client device or client 60 includes a central processing unit (CPU) 62, coupled by means of a system bus 64 to a memory 66, a non-volatile memory 68, a security processor (or co-processor) 70, and a network interface 72. In addition, the CPU 62 is coupled to a disk storage device 74 by means of a disk controller 76 and the system bus 64. In general, the CPU 62 executes software instructions stored in the non-volatile memory 68 (e.g., boot-up instructions), and memory 66. Accordingly, instructions associated with application software stored on disk storage 74 may be read by the CPU 62 and temporarily stored in memory 66. The disk 74 may also store digital content (e.g., such as video and audio) that is processed by the CPU 62, and played, or presented, to a user via a display subsystem (not shown). In addition, a user interface process may initially be stored on disk 74, and executed by the CPU during operation.

In one embodiment of the invention, one or more of the individual components shown in FIG. 6 may be part of a system-on-a-chip (SoC). For example, in one embodiment of the invention, the CPU 62, security processor 70, memory 66, and non-volatile memory 68 may all be part of a SoC. It will be appreciated by those skilled in the art that the client device 60 may include a variety of other functional components (e.g., a display subsystem and/or an additional communication component) that are not germane to the invention, and therefore have not been included in FIG. 6.

In one embodiment of the invention, the security processor 70 is dedicated to providing security services, such as encryption and decryption routines. For example, the security processor 70 may provide processing power for encryption/decryption tasks that are computationally intensive. Moreover, the security processor 70 may include one or more encryption keys, such as the master key illustrated in FIG. 6 that can be used for encryption and decryption algorithms. Accordingly, the security processor 70 may provide the client 60 with a wide variety of cryptographic and/or security functions or services.

It will be appreciated by those skilled in the art that the client device 60 illustrated in FIG. 6 is but one example of a client device with which the present invention may be implemented. Accordingly, certain aspects and/or functions described in connection with the client device illustrated in FIG. 6 may be excluded from a particular implementation, without departing from the spirit of the invention. For example, it will be appreciated by those skilled in the art that an embodiment of the invention may not have a security processor. In one embodiment of the invention, security functions provided by the security processor may be excluded, or alternatively, provided by a general purpose processor. Furthermore, it will be appreciated by those skilled in the art that the present invention may be applicable to a wide variety of client devices and content delivery systems in addition to those illustrated in FIGS. 7 and 8. For example, consistent with the invention, the client device 60 may be implemented in one of many possible form factors, including (but not limited to): a set-top box, a handheld player, a mobile phone, a personal digital assistant, or a game playing device.

Figure 7:
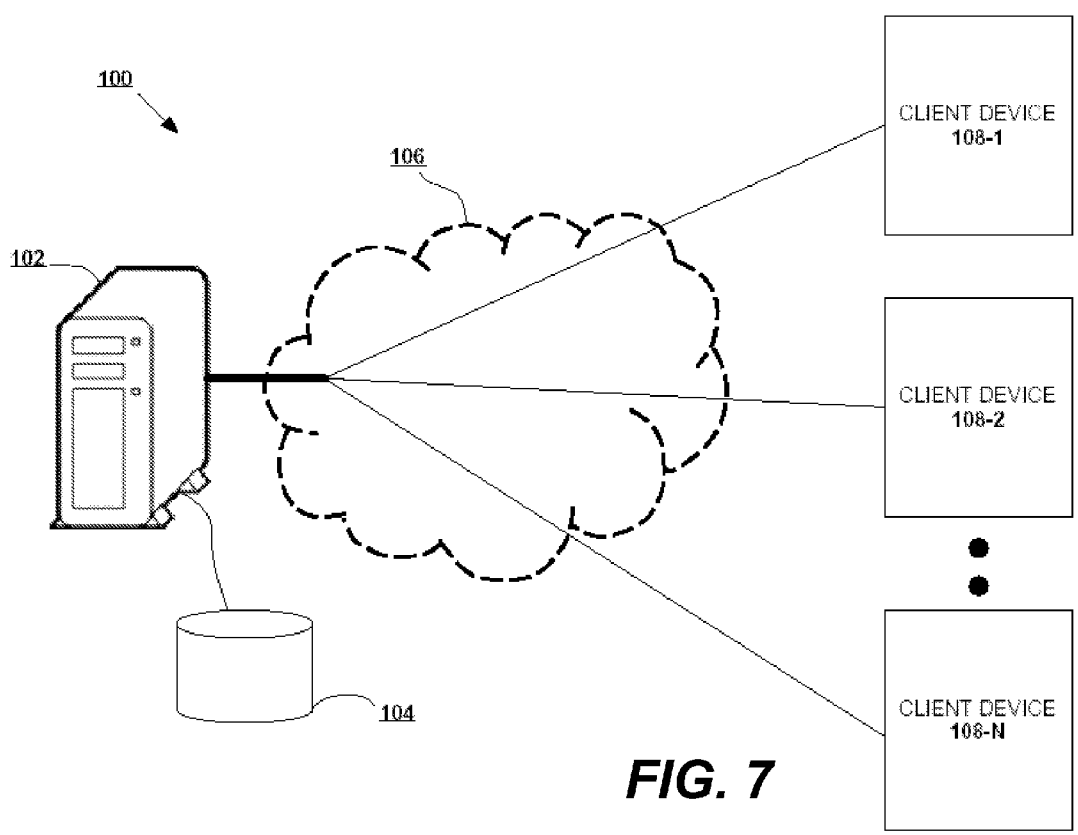
FIGS. 7 and 8 illustrate different digital content delivery systems, in which a client and server according to an embodiment of the invention, may be utilized.

FIG. 7 illustrates a client-server based digital content delivery system 100, in which a client device 108 according to an embodiment of the invention may be utilized. The digital content delivery system 100 of FIG. 7 includes a digital content server 102 with a mass storage device 104 for storing digital content. The digital content server 102 is coupled by means of a network 106 to multiple client devices 108-1, 108-2 and 108-n. In operation, a particular client device 108-1 may communicate a request for a particular title (e.g., movie), or other digital content, to the content server 102. In response, the content server 102 reads the digital content from the mass storage device 104, encrypts the digital content with an encryption key, and then communicates the digital content over the network 106 to the requesting client device 108-1. Upon receiving the encrypted digital content, the client device 108-1 executes a procedure for decrypting the digital content and then displaying the digital content to the user.

Figure 8:
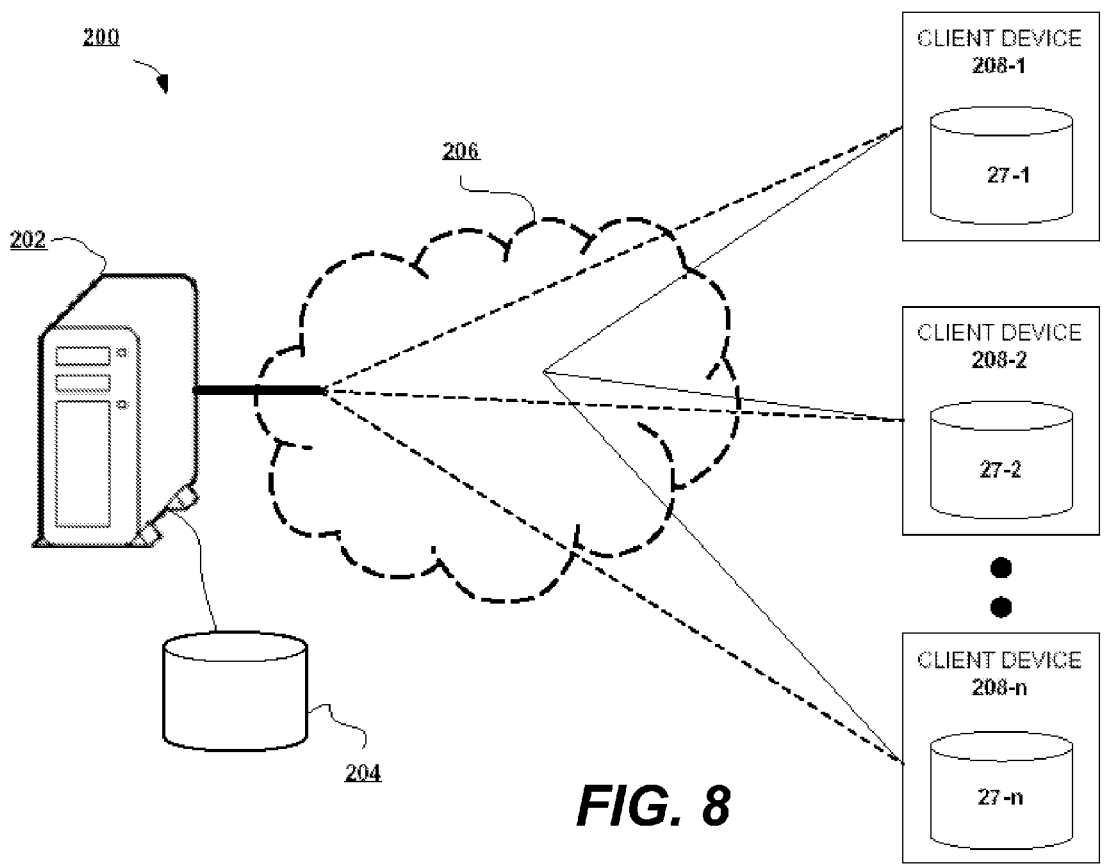

FIG. 8 illustrates a distributed delivery system 200. In contrast to the client-server based system 100 of FIG. 7, the system of FIG. 8 is a distributed system, wherein the content is primarily distributed collectively in the storage devices 207-1, 207-2 and 207-n of each individual client device 208-1, 208-2 or 208-n. In other words, each of the client devices 208-1, 208-2 and 208-n locally caches some of the content. For example, data for a movie title is fragmented into a number of data segments, each of the segments is distributed into a selected number of clients, another segment is distributed into another selected number of clients or so forth. Consequently, when a particular client device 208-1 makes a request for a particular title, the server 202 manages the delivery process by identifying which ones of the other clients to upload the needed segments. Namely, the actual data is communicated to the requesting client 208-1 over the network 206 from other client devices (e.g., some of the client devices 208-2 through 208-n) in a peer-to-peer fashion. For example, in one embodiment of the invention, a plurality of peer clients communicate data blocks nearly concurrently to the requesting client. Furthermore, in one embodiment of the invention, each segment that is communicated from a peer client to the requesting client contains non-consecutive data blocks that must be combined, or multiplexed (at the requesting client) with data blocks of other segments received from other peer clients.

In another embodiment of the invention, data pertaining to a title may be streamed from both a digital content server and peer clients. Accordingly, one embodiment of the system may be thought of as a hybrid of a client-server and peer-to-peer delivery system. One such system is more completely described in U.S. patent application Ser. No. 11/269,462 filed on Nov. 7, 2005, and commonly assigned.

Thus, a method and system for facilitating an efficient client-side search have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

I claim

1. A method, to be performed by one or more processors, for searching a library for one or more titles, the method comprising:
   generating a first graphic user interface to receive inputs from a user;
   receiving a plurality of inputs, entered in succession, wherein each of the plurality of inputs corresponds to a letter;
   searching the library for a set of titles based on the plurality of inputs, wherein each title in the set includes a plurality of words, the number of words in each title being at least equal to the number of inputs received from the user, wherein each of the plurality of inputs matches the first letter of a respective one of the plurality of words in each of the titles, and wherein the number of titles in the set is progressively reduced in response to each successive input; and
   displaying the set of titles on the first graphic user interface.

2. The method of claim 1, further comprising:
   enabling the user to select one of the titles displayed on the first graphic user interface; and
   displaying, on a second graphic user interface, information pertaining to the selected title.

3. The method of claim 1, wherein the plurality of words do not include articles, if any, in the titles.

4. The method of claim 1, wherein searching the library for a set of titles comprises:
   in response to receiving one of the plurality of inputs, corresponding to a first letter, searching the set of titles for one or more titles that include at least one word beginning with the first letter; and
   removing, from the set, titles that do not include at least one word beginning with the first one letter.

5. The method of claim 1, wherein searching the library for a set of titles comprises searching a data structure for the set of titles, wherein the data structure includes data corresponding to a plurality of movies.

6. The method of claim 5, further comprising organizing the data based, at least in part, on an alphabetical order of movie titles associated with the data.

7. The method of claim 6, further comprising organizing the data structure to include a data header portion, wherein the data header portion has an index for locating data corresponding to an individual movie.

8. The method of claim 7, wherein the data structure comprises an integral number of sectors and wherein organizing the data structure comprises organizing the data such that the sectors are aligned on sector boundaries of a data store that is organized as a sequence of tunable-sized blocks.

9. The method of claim 8, wherein the data structure is provided on a server configured to analyze data organized in a hierarchical directory.

10. The method of claim 9, further comprising organizing the plurality of data in the data structure as pre-computed query results.

11. A system for searching a library for one or more titles, the system comprising:
    a device to receive a plurality of inputs from a user, entered in succession, wherein each of the plurality of inputs corresponds to a letter, the device being configured to search the library for a set of titles based on the plurality of inputs, wherein each title in the set includes a plurality of words, the number of words in each title being at least equal to the number of inputs received from the user, wherein each of the plurality of inputs matches the first letter of a respective one of the plurality of words in each of the titles and wherein the number of titles in the set is progressively reduced in response to each successive input; and
    a display, coupled to the device, to display the set of titles on a first graphic user interface.

12. The system of claim 11, wherein the first graphic user interface enables the user to select one of the titles, and wherein a second graphic user interface displays information pertaining to a selected title.

13. The system of claim 11, wherein the plurality of words do not include articles, if any, in the titles.

14. The system of claim 11, wherein upon receiving one of the plurality of inputs, corresponding to a first letter, the device is configured to: (i) search the set of titles for one or more titles that include at least one word beginning with the first letter, and (ii) remove, from the set, titles that do not include at least one word beginning with the first letter.

15. The system of claim 11, wherein the device is further configured to search a data structure for the set of titles, wherein the data structure includes data corresponding to a plurality of movies.

16. The system of claim 15, wherein the data is organized based, at least in part, on an alphabetical order of movie titles associated with the data.

17. The system of claim 16, wherein the data structure is organized to include a data header portion, wherein the data header portion has an index for locating data corresponding to an individual movie.

18. The system of claim 17, wherein the data structure comprises an integral number of sectors and the data is organized such that the sectors are aligned on sector boundaries in a data store that is organized as a sequence of tunable-sized blocks.

19. The system of claim 18, wherein the data structure is provided by a server configured to analyze data organized in a hierarchical directory.

20. The system of claim 19, wherein the data in the data structure is organized as pre-computed query results.

* * * * *